Feb. 5, 1963   N. V. FRYE   3,076,532
POLE OR STAKE HOLDER
Filed May 19, 1961
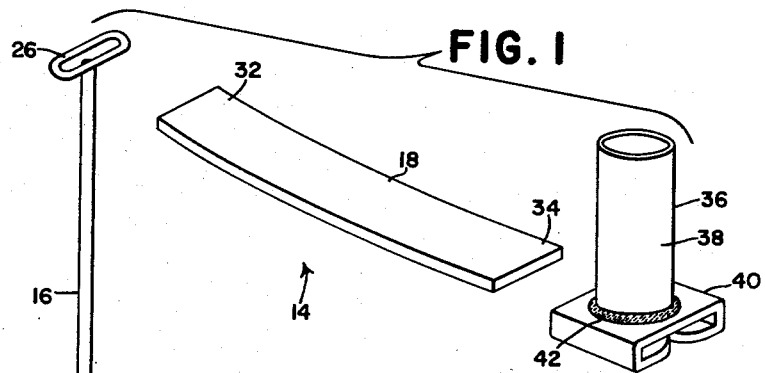
FIG. 1
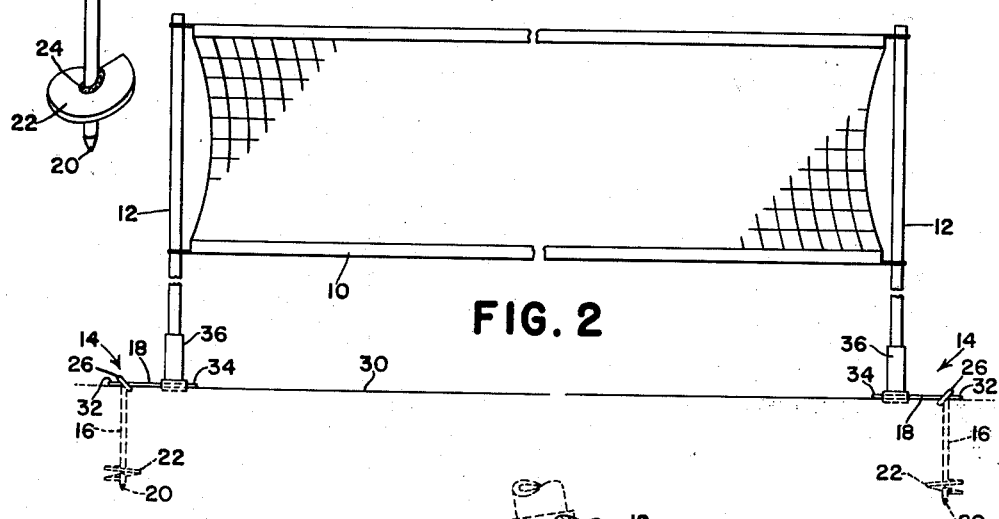
FIG. 2
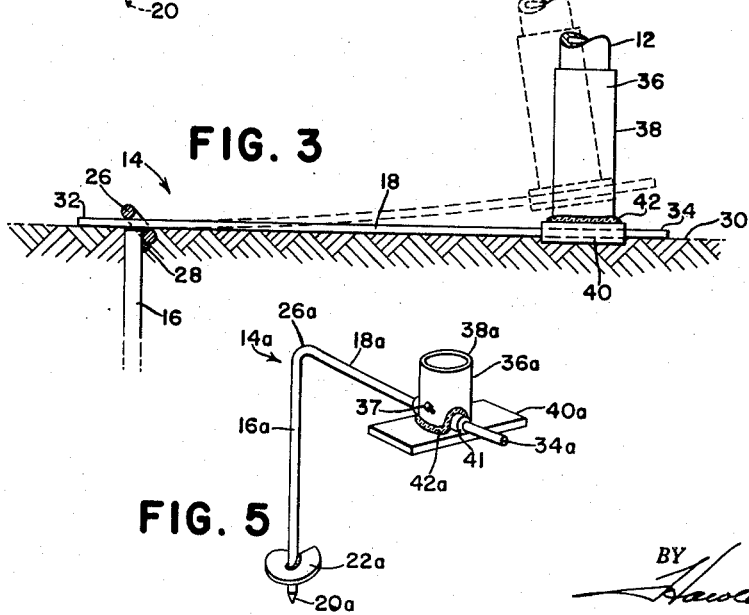
FIG. 3
FIG. 5
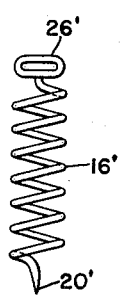
FIG. 4
INVENTOR.
N. V. FRYE
BY 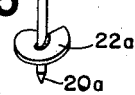
ATTORNEY

United States Patent Office 3,076,532
Patented Feb. 5, 1963

3,076,532
POLE OR STAKE HOLDER
Norman V. Frye, Rte. 2, Davenport, Iowa
Filed May 19, 1961, Ser. No. 111,275
11 Claims. (Cl. 189—29)

This invention relates to a pole or stake holder and more particularly to such holder as is equipped with means for anchoring same to the ground.

It is a feature of the invention to provide an improved stake or pole holder which needs no guy wires and the like, and further to provide such holder for use in the erection of nets and lines for athletic events, games, etc. The invention finds special utility in the erection and supporting of nets for badminton, tennis and the like, wherein a net is stretched between a pair of stakes or poles which are affixed to the ground by the ground anchor portions of the improved holding means. An important object of the invention is to provide such means with a member which is yieldable or resilient and which can be deflected under the load applied in stretching the net or line and which thereby serves to keep the net or line taut. Other objects reside in improved ground anchor means, in which the invention takes one or more forms, in one having an auger for use in sod or the like and the other comprising a helix in the form of a coil spring for use in gravel or the like. Another object of the invention is to provide the improved holder in several forms embodying the same basic principle, the invention in one form being readily disconnectible as respects its several parts, which not only facilitates packaging but also enables adjustment.

The foregoing and other important objects and desirable features inherent in and encompassed by the invention will become apparent as preferred embodiments thereof are disclosed, by way of examples, in the following description and accompanying sheet of drawings, the figures of which are described below.

FIGURE 1 is an exploded perspective view of one form of invention comprising three basic parts.

FIGURE 2 is a reduced somewhat schematic view illustrating the invention of FIGURE 1 paired for use in a typical situation.

FIGURE 3 is an enlarged elevational view, partly in section, showing the functioning of that form of the invention shown in FIGURES 1 and 2.

FIGURE 4 is a modified form of ground anchor means for use with two of the components in FIGURE 1.

FIGURE 5 is a further modification showing the embodiment of the invention in a two-piece form in which the leg means for penetrating the ground and the other leg means for overlying the ground are rigidly interconnected or of one-piece construction.

It should be understood at the outset that the several forms of the invention illustrated are but representative of many forms that it could take. Those illustrated have been successfully used, but nevertheless, as the disclosure progresses, variations will readily suggest themselves, it being further understood that sizes and dimensions are not critical, since these may be varied to suit particular needs.

In the representative functional example shown in FIGURE 2, a tennis or badminton net 10 is stretched between a pair of upright poles 12, and each of these poles is mounted in erect or upright position on the ground by that form of the invention shown in FIGURES 1 and 3, each structure being referred to, as a whole, as leg means identified by the numeral 14.

Considered in its assembled or use relationship, each leg means will be seen to be of inverted L-shape, having a vertical leg 16 and a lateral or substantially horizontal leg 18. The vertical leg 16 is preferably in the form of a steel rod of cylindrical section, substantially the entire length of which is adapted to penetrate the ground, which function is facilitated by a pointed lower end 20 and a helical or screw portion 22 coaxially affixed to the rod as by welding at 24. The upper end of the leg or rod 16 is provided with an eye or loop 26 which is of elongated or chain-link feature, welded or otherwise rigid with the upper end of the rod 16, as best illustrated at 28 in FIGURE 3. When the rod 16 penetrates the ground, the loop or eye 26 is permitted to lie at or slightly above ground level, which is indicated by the line 30 in FIGURES 2 and 3. In such case, the horizontal leg 18, overlies the ground, one end of the leg, as at 32 being received in the loop or eye 26 and the other end, as at 34, extending laterally or horizontally. When the two means or structures 14 are used in pairs, as in FIGURE 2, the legs 18 will extend toward each other, and each will have mounted thereon socket means 36 for respectively receiving the poles 12. Each socket means is preferably in the form of a tubular upright or sleeve 38 and a base or slide part 40 which is slidably receivable of the lateral leg 18, the interior of the slide part 40 being preferably of channel-shape as shown, and the two parts 38 and 40 being rigidly secured together as by welding at 42. Because of the slidability between the leg 18 and the socket means 36, the latter may be adjusted lengthwise along the former. A further adjustment is possible because of the slidability between the end 32 of the leg 18 and the loop or eye 26 at the exposed or upper end of the rod 16.

It is a feature of the invention that the leg 18 is upwardly bowed or otherwise arranged so that in initial position it diverges upwardly and inwardly relative to the ground and in a direction away from the axis of the rod 16, as shown in dotted lines in FIGURE 3. In the paired relationship shown in FIGURE 2, the legs 18 extend toward each other, as shown. In each instance, the divergence of the leg 18 relative to the ground causes the axis of the socket means 36 to be inclined away from the vertical and toward the vertical axis extended of its associated rod 16. Thus, when the poles 12 are inserted in the respective socket means, these poles may be used as lever arms to deflect the resilient leg 18 downwardly so that it lies on the ground, or closely thereto, and this position is maintained by installing the net 10, which thus holds the members 18 against their upward bias and consequently results in a taut condition of the net. This would of course be true of a line or other means connected between two poles, of which those at 12 are representative. In actual practice, it is preferable to construct the leg 18 of spring steel having the initial bow therein as indicated.

One feature of providing the components 16, 18 and 36 as separate pieces is that the item may be readily packaged as a unit. Beside the adjustment afforded by the relative slidability between the parts 18 and 16 and between the parts 18 and 36, the part or leg 18 is useful as a lever arm or handle in screwing the rod 16 into the ground. The leaf spring nature of the leg 18 gives its undersurface a rocker effect on the ground (FIGURE 3), and the angle of the general plane of the loop or eye 26 is such that even though the upper end of the rod 16 may be slightly above the ground surface, the leg 18 will act on the lower portion of the eye 26 and will react on the upper portion. In other words, the basic fulcrum of the rocker may be either the ground surface or the lower portion of the eye 28. The receipt of the end 32 of the leaf spring or leg 18 in the eye 26 may be regarded as a connection means which is separable by withdrawing the leg 18 from the eye or loop 26 and which is connectible, of course, by inserting the former into the latter. It will be clear, of course, that variations in the force required to deflect the leg 18 will be accomplished by varying the distance between the socket means 26 and the upper end of the rod 16, and these forces may consequently be used in effecting adjustment in the tension of the net or other element anchored between two poles of which those at 12 are representative.

In actual practice, it is found that the ground anchor leg 16 is suitable for use in soil such as is found on lawns and other areas of like nature. However, in gravelly soils, it is preferred to use a different form of ground anchor, such as that shown in FIGURE 4 at 16'. The basic difference of this over that at 16 is that the FIGURE 4 embodiment has its helix in the form of a coil spring terminating in a lower axial point 20'. Otherwise, the anchor or leg 16' has at its upper end an eye or loop 26' which has the same structure and function of that at 26 in FIGURES 1, 2 and 3. This eye is receivable of a leg such as that at 18 in FIGURES 1, 2 and 3 and when the parts 18 and 16' are connected, their function is the same as that previously described, the leg 18 again receiving the socket means 36 or its equivalent.

FIGURE 5 illustrates a one-piece construction of an inverted L-shaped means 14a having an upright or vertical leg 16a and a lateral or horizontal leg 18a. The leg 16a is similar to the leg 16 in that it is pointed at its lower end at 20a and has a ground-engaging auger portion or helix 22a. However, instead of the separable connection 26—32 of FIGURES 1 through 3, the legs 18a and 16a are joined at a connection means or junction 26a, preferably being made of one-piece so that the lateral leg 18 extends to a free or terminal end 34a which is receivable of a socket means 36a similar to that previously described, except that in this case the space or slide portion 40a of the socket means 36a is made of sufficient ground-contacting area to prevent twisting thereof about the longitudinal axis of the leg 18a, which, being a part of the rod 16a, is of circular cross section. However, the leg 18a could be made of heavier material welded or otherwise joined to the rod 16a. In any event, the socket means 36 is adjustable lengthwise along the leg 18a and releasable locking means is provided, in the form of a set screw 37. The base or slide part 40a has rigidly secured thereto, as by welding at 42a, a socket 38a for receiving a pole such as that at 12, and the welding at 42a is useful in securing between the parts 36a and 40a a rod-receiving sleeve 41. As illustrated, the leg or rod portion 18a is bowed to accomplish the same function as the bowed leaf spring 18 in the previously described form of the invention.

Experience to date has shown that these forms of the invention are economical to construct, efficient in operation and have unusually long life. The simplicity feature is further exploited in that the structures are useable without employing guy wires, special tools and the like, since the basic components have multiple functions; for example, the legs 18 or 18a are useful for screwing the ground anchor portions into the ground, and the socket means are receivable of poles which serve as lever arms for deflecting the legs 18 or 18a to accomplish the desired tension in the net or other element employed with the ground-engaging structures. Features and advantages other than those enumerated will readily occur to those versed in the art, as will many modifications and alterations in the preferred embodiments disclosed, all of which may be achieved without departure from the spirit and scope of the invention.

What is claimed is:

1. A support for poles and the like, comprising: inverted L-shaped means having a vertical leg adapted to penetrate the ground and a lateral leg adapted to overlie the ground, said lateral leg having a free end relatively remote from the vertical leg and said free end having upwardly directed pole-receiving socket means thereon generally normal to said lateral leg, said lateral leg being resilient and initially shaped and disposed to diverge upwardly relative to the ground in the direction away from the vertical leg so that the axis of the socket means is inclined to the vertical in the direction toward the vertical axis extended of the vertical leg whereby downward deflection of the lateral leg causes the axis of the socket means to approach the vertical.

2. The invention defined in claim 1, in which: the socket means is adjustable lengthwise of the lateral leg.

3. The invention defined in claim 1, in which: the two legs are separate members joined by separable connection means, said vertical leg having a lower ground-penetrating portion and an upper exposed portion at said connection and said lateral leg having a second end portion at said connection, and said connection includes an eye on said upper exposed portion and said second end of the lateral leg is removably received in said eye.

4. The invention defined in claim 3, in which: said eye opens laterally of the length of the vertical leg and the lateral leg is additionally slidably received in said eye for adjustment of said lateral leg along its length.

5. The invention defined in claim 4, in which: the socket means is adjustable lengthwise of the lateral leg.

6. The invention defined in claim 3, in which: the socket means is removable from the lateral leg.

7. The invention defined in claim 1, in which: the vertical leg has helical means thereon by means of which it can be screwed into the ground with said lateral leg functioning as a lever arm.

8. The invention defined in claim 1, in which: the lateral leg has an under, ground-engaging side in the form of a rocker in which a portion proximate to the vertical leg rests on the ground to initially dispose the free end in spaced relation above the ground.

9. The invention defined in claim 1, in which: the two legs are separate members joined by separable connection means, said vertical leg having a lower ground-penetrating portion and an upper exposed portion at said connection and said lateral leg having a second end portion at said connection, and said connection includes an eye on said upper exposed portion and said second end of the lateral leg is removably received in said eye and the lateral leg has an under ground-engaging side in the form of a rocker in which a portion proximate to the vertical leg rests on the ground to initially dispose the free end in spaced relation above the ground.

10. The invention defined in claim 1, in which: the two legs are separate members joined by separable connection means, said vertical leg having a lower ground-penetrating portion and an upper exposed portion at said connection and said lateral leg having a second end portion at said connection, and said connection includes an eye on said upper exposed portion and said second end of the lateral leg is removably received in said eye, and the lateral leg is in the form of a leaf spring upwardly bowed to initially dispose the free end in spaced relation above the ground.

11. The invention defined in claim 1, in which: the lateral leg is in the form of a leaf spring upwardly bowed to initially dispose the free end in spaced relation above the ground.

References Cited in the file of this patent

UNITED STATES PATENTS

| | | |
|---|---|---|
| 919,807 | Bailey | Apr. 27, 1909 |
| 959,286 | Bailey | May 24, 1910 |

FOREIGN PATENTS

| | | |
|---|---|---|
| 265,715 | Great Britain | Feb. 17, 1927 |